United States Patent [19]

Silva

[11] Patent Number: 4,466,386

[45] Date of Patent: Aug. 21, 1984

[54] SYSTEM AND METHOD OF VAPORIZING LIQUID FOR DELIVERY TO AN INTERNAL COMBUSTION ENGINE

[76] Inventor: Robert E. Silva, 6452 N. 8th St., Fresno, Calif. 93710

[21] Appl. No.: 335,067

[22] Filed: Dec. 28, 1981

[51] Int. Cl.³ ............................................ F02M 25/02
[52] U.S. Cl. ............................... 123/25 B; 123/25 D; 123/25 P
[58] Field of Search ................. 123/25 B, 25 D, 25 P, 123/25 N

[56] References Cited

U.S. PATENT DOCUMENTS

| | | | |
|---|---|---|---|
| 1,592,640 | 7/1926 | Muzzy | 123/25 B |
| 1,711,408 | 4/1929 | Fritz | 123/25 B |
| 2,444,628 | 7/1948 | Briggs | 123/25 B |
| 2,444,670 | 7/1948 | Porter | 123/25 B |
| 2,674,235 | 4/1954 | Drydyke | 123/25 B |
| 2,811,146 | 10/1957 | Spillmann | 123/25 B |
| 3,177,851 | 4/1965 | Berger | 123/25 B |
| 4,027,630 | 6/1977 | Giardini | 123/25 P |
| 4,030,453 | 6/1977 | Sugimoto | 123/25 B |
| 4,030,456 | 6/1977 | Corpus | 123/25 B |

Primary Examiner—Ira S. Lazarus
Attorney, Agent, or Firm—Thorpe, North & Western

[57] ABSTRACT

A low pressure/low temperature vapor generating system for use in internal combustion engines includes a supply of water or other liquid to be vaporized, heating apparatus which uses heat generated by the internal combustion engine to heat the water and convert it to steam, conduits for delivering the steam to the intake of the carburetor of the internal combustion engine, and a pressure/temperature control device disposed in the conduit for maintaining the pressure and temperature in the conduit at or below some predetermined levels. Also included is a water flow control tank located between the water supply and the heating apparatus for receiving water from the supply at a controlled rate and for delivering water to the heating apparatus. A condensate separator is located between the pressure/temperature control device and the carburetor for removing condensed water droplets from the conduit carrying the steam to the carburetor. A volume control valve disposed between the heating apparatus and the pressure/temperature device controls the volume of steam delivered to the intake of the carburetor.

22 Claims, 4 Drawing Figures

SYSTEM AND METHOD OF VAPORIZING LIQUID FOR DELIVERY TO AN INTERNAL COMBUSTION ENGINE

BACKGROUND OF THE INVENTION

This invention relates to a low pressure/low temperature vapor generating system and method for use in internal combustion engines.

It is well known that the introduction of water vapor into an internal combustion engine along with the intake of fuel and air improves the operation of the engine and reduces the production of exhaust pollutants. The water vapor is converted to steam in the engine's combustion chambers and in the process expands to provide additional driving force against the pistons and thereby enhance power production. Also, conversion of the water vapor to steam results in absorption of heat which helps control flame advance and pre-ignition. Finally, the levels of pollutants, such as hydrocarbons, carbon monoxides, and nitrous oxides, in exhaust emissions are decreased. The above advantages are derived because a more complete combustion of the fuel is achieved with the introduction of the water vapor.

It is also well known that the more finely divided are the water droplets or particles, the better will be the blending of the water vapor with the fuel/air mixture, the less interference there will be with the fuel/air carburetion process, and the more even will be the combustion of the fuel.

Exemplary patents which discuss various aspects of water induction in internal combusion engines include U.S. Pat. Nos. 2,977,940, 3,177,851, 3,712,281, 3,716,040, 3,749,376, 3,866,579, 3,911,871, 3,996,902, 4,098,231, 4,119,063, 4,125,092, 4,150,639, 4,204,485, and 4,208,989.

SUMMARY OF THE INVENTION

It is an object of the present invention to provide a new and improved system and method for introducing finely divided water or other liquid vapor into an internal combustion engine.

It is another object of the invention to provide such a system and method for introducing water vapor into an internal combustion engine in such a fashion as to not interfere with the fuel/air mixture normally utilized in the engine.

It is also an object of the invention to provide such a system and method whereby low pressure/low temperature water vapor is supplied to the carburetor intake of an internal combustion engine.

It is an additional object of the invention to provide such a system and method wherein large water droplets are removed from the water vapor prior to introduction of such vapor into the internal combustion engine.

It is a further object of the invention to provide such a system and method in which the water vapor is supplied to the internal combustion engine as it is needed to effect a more efficient operation of the engine.

It is still another object of the invention to provide a system and method of introducing finely divided water vapor into internal combustion engines which utilize either gasoline, propane, natural gas or certain other types of fuel.

The above and other objects of the invention are realized in a specific illustrative embodiment of a vapor generating system which includes a supply of water or other liquid, apparatus for heating the water from the supply to convert it to steam, a system for delivering the steam from the heating apparatus to the air intake of the carburetor, and a pressure relief device coupled into the delivery system for operating to vent the delivery system when the pressure therein exceeds some predetermined level. By maintaining the pressure at a predetermined low level, the temperature of the steam is also maintained low and this facilitates conversion of the steam to a fog when it is introduced into the stream of air being drawn into the carburetor of the engine. The resulting fog consists of finely divided water particles which readily blend with the fuel/air mixture, without interfering with or changing the ratio of fuel to air.

In accordance with one aspect of the invention, condensate separator apparatus is provided in the delivery system between the pressure relief device and the carburetor for removing condensed water droplets from the delivery system. In accordance with another aspect of the invention, a water flow control tank is provided in the system between the water supply and the heating apparatus to control the volume of water delivered to the heating apparatus. As an example, if the rate at which water is being converted to steam is less than the rate at which water is being delivered to the heating apparatus, then the rate of delivery of water to the heating apparatus is reduced. Also, if the pressure produced by the production of steam in the heating apparatus exceeds a certain level, then delivery of water to the heating apparatus is either reduced or temporarily stopped. Apparatus may also be provided for controlling the volume of steam delivered to the carburetor dependent upon the speed of the engine.

The above features of the invention provide for more complete combustion of the fuel and the attendant improvement in engine efficiency and reduction of harmful exhaust pollutants.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
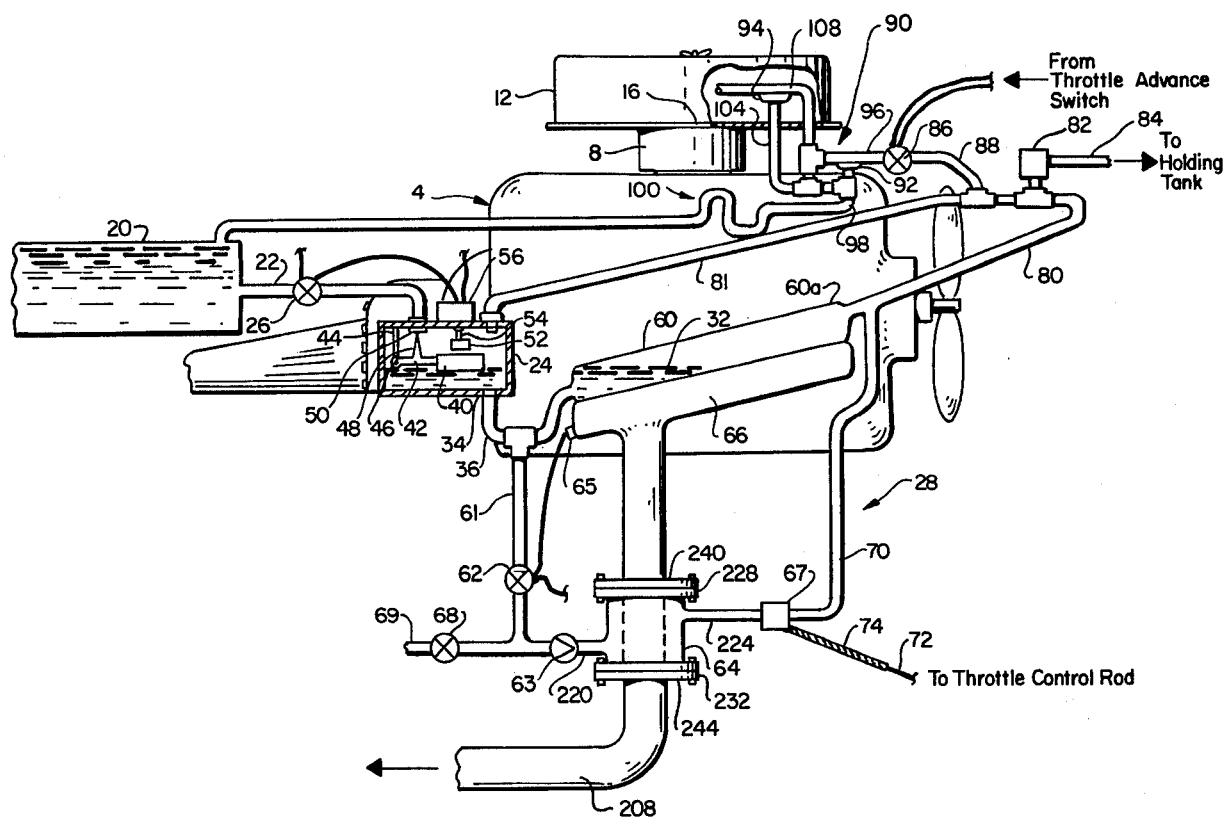
FIG. 1 is a schematic representation of a vapor generating system made in accordance with the principles of the present invention.

Referring to FIG. 1, there is shown a specific illustrative embodiment of the present invention used in connection with an internal combustion engine 4 which includes a conventional carburetor 8 having an air filter 12. When the engine is operated, air is drawn through the air cleaner 12 into an intake port 16 of the carburetor 8 and then the carburetor mixes the air with fuel for delivery to the engine.

The illustrative vapor generating and delivery system of the present invention includes a supply of water or other liquid in the form of a tank 20. The supply tank 20 is simply filled with water as for use in the engine. The tank needed could be situated anywhere on the automobile convenient for filling and at an elevation that will enable delivery of water to a water control container 24, shown in cross section in FIG. 1. Water is delivered to the container 24 from the tank 20 via a conduit 22 which includes a control valve 26. The water is delivered through the top wall of the container 24 to the interior thereof as shown.

The water control container 24 is provided to control the volume of water flowing from the supply tank 20 to heating apparatus 28 and to maintain a certain liquid level, shown at 32, in the heating apparatus. Water is delivered from the water control container 24 through an orifice 34 in the bottom wall thereof and through a conduit 36 to the heating apparatus 28. Included in the water control container 24 is a float element 40 adapted to float on the water in the container. The float element 40, which could be an air filled container or other lighter than water object, is mounted on one end of a pivot arm 42, the other end of which is pivotally coupled to a support arm 44 so as to pivot about a pivot axis 46. Extending upwardly from the pivot arm 42 is a needle 48 which is positioned to enter an input orifice 50 (through which water is delivered to the container 24) as the float 40 moves upwardly. The combination of the needle 48 and input orifice 50 takes the form of a needle valve to block the flow of water into the container 24 as the needle 48 moves upwardly in the orifice 50. As the water level in the container 24 lowers so that the float 40 moves downwardly, the needle 48 is removed from the input orifice 50 to allow more water to flow into the container. In this manner, control of the volume of water flowing into the container 24 is maintained.

If for some reason the arrangement of the needle 48 and orifice 50 fails to stop the flow of water into the container 24 when the water level exceeds the point where such flow would normally be stopped, provision is made for operating the valve 26 to a closed position to prevent further flow of water from the supply 20 to the container 24. In this regard, a second float 52 is mounted on the end of a switch plunger 54 which is part of a switch 56 mounted exterior to the container 24. That is, the plunger 54 of the switch extends into the container and on the end of the plunger is mounted the second float 52. When the water level in the container 24 reaches the level of the second float 52 to force it upwardly to operate the switch 56, the switch signals the valve 26 to cause it to close to thereby stop further flow of water into the tank 24. When the water level in the container 24 lowers so that the water is not forcing the float 52 upwardly, the switch 56 removes the signal from the valve 26 so that the valve opens to again allow the flow of water to the container. In the manner described, control of the volume of water flowing into the container 24 is effected by the float 40, needle 48 and orifice 50, and an additional safety feature is provided by the second float 52 and switch 56 in the event that the water level in the container rises beyond a certain level.

The heating apparatus 28 includes two chambers 60 and 64 into which water may flow from the container 24 for conversion thereof to steam. Chamber 60 consists generally of an elongate tube disposed at a slight angle so that an exit portion 60a is elevated above the container 24. At least a portion of the chamber 60 is intimately connected to a heat source 66 which is part of the internal combustion engine with which the system of the present invention is used. Advantageously, the heat source 66 could be the exhaust manifold of the internal combustion engine or a portion of the exhaust pipe so that hot gasses flowing therethrough would serve to heat the chamber 60. The chamber 60 is made of a heat conductive material such as aluminum, copper, steel, etc. and is placed in intimate contact with the jacket of the heat source 66.

Water is supplied from the container 24 to the chamber 60 on a continual basis so that as the water is converted to steam in the chamber, additional water flows from the container 24 into the chamber. The water level in the chamber 60 is maintained substantially the same as the water level in container 24 by reason of a pressure equalization line 81. The pressure equalization line 81 is coupled to the container 24 and to conduits 80 and 88 which are, in turn, coupled to the chamber 60, so that the pressure is equalized in the container 24 and the chamber 60 even though steam is being produced in the chamber. As a result of the pressure equalization, the liquid levels in the container 24 and chamber 60 are maintained about the same.

Steam is also produced in the chamber 64 but on a "demand basis" rather than continually as in the case of chamber 60. That is, water is supplied from the container 24 via conduit 61 to the chamber 64 under control of an on/off valve 62 and a check valve 63. Valve 62 is normally closed to prevent the flow of water to the chamber 64 and is caused to open by a thermal switch 65 which is mounted on the heat source 66. When the temperature of the heat source reaches a certain level, for example 215° F., the thermal switch 65 applies a signal to the valve 62 to cause it to open. Operation of the valve 62 is keyed, to a certain extent to the needs of the engine so that when the engine is just starting up and is still cool, water is not allowed to flow to the chamber 64. When the engine is warmed up so that the temperature of the heat source 66 reaches the predetermined level, the valve 62 is opened so that chamber 64 can begin producing steam for delivery to the carburetor 8.

The check valve 63 is normally open to allow the flow of water to the chamber 64 and is caused to close as the chamber begins producing steam so that the pressure in the chamber increases. Thus, when the pressure in the chamber 64 reaches a certain level, check valve 63 is closed to prevent introduction of any more water into the chamber. Then, when the steam has been delivered from the chamber 64, the check valve 63 again opens to allow more water into the chamber, and so on.

Volume control valve 67 is provided in a steam delivery line 70 to control the volume of steam flowing through the line. The valve 67 might illustratively be a butterfly valve whose position (how much open or closed) is determined by the throttle advance. In particular, the valve 67 is coupled by way of a flexible wire 72 (disposed in a flexible sheath 74) connected to a throttle control rod 412 (FIG. 4) of the engine. Thus, as the throttle control rod 412 is advanced to increase the speed of the engine, the valve 67 is caused to open more to allow more steam to flow in line 70. (The valve 67 might also be controlled by the vacuum advance of the engine.)

Conduit 69 and valve 68 are coupled into the conduit 61 to provide a point of entry for another liquid such as alcohol to be introduced into the system. Thus, a supply of liquid would be connected to conduit 69, and then the valve 68 could be selectively opened and closed to allow the delivery of the liquid to the chamber 64 for heating.

Figure 2:
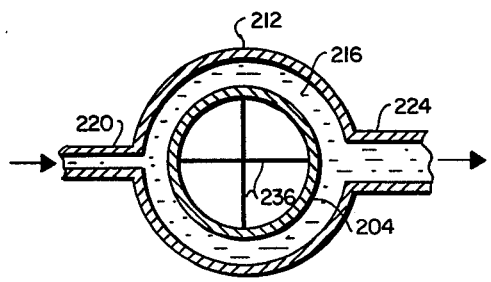
FIG. 2 is a top, cross-sectional view of the water heating chamber 64 of FIG. 1.

The chamber 64 includes a cylindrical interior wall 204 which is about the same diameter as the exhaust pipe 208 of the internal combustion engine with which the system of the present invention is used (see FIG. 2). An outer wall 212 circumscribes and is spaced from the interior wall 204 to define a cavity 216 which receives water from the container 24 via an input duct 220 connected into the outer wall. An output duct 224 carries steam from the cavity 216. The cavity 216 is enclosed by reason of a top wall 228 (see FIGS. 1 and 3) and a bottom wall 232 so that the only access to the cavity 216 is via input duct 220 or output duct 224. The upper wall 228 and bottom wall 232 have centrally located openings 234 (FIG. 3) so that exhaust gases may flow therethrough when the chamber 64 is fitted into place in the exhaust pipe 208 as shown in FIG. 1.

The chamber 64 is mounted on the exhaust pipe 208 by cutting out a section of the pipe having a length about equal to the height of the chamber 64, and by providing annular rims 240 and 244 on the ends of the pipe resulting from removal of the section. These rims are mounted on respective ends of the pipe to allow mating of the rims with the upper wall 228 and lower wall 244 of the chamber 64. The chamber 64 is held in place by bolts or other fastening devices fitted through openings 248 in the walls 228 and 232 which are aligned with corresponding openings in rims 240 and 244.

Figure 3:
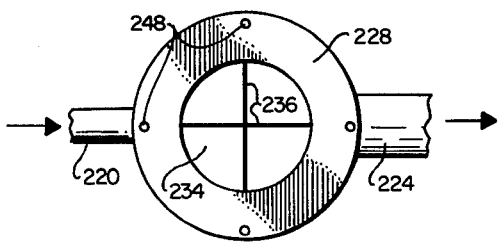
FIG. 3 is a top, plan view of the water heating chamber 64 of FIG. 1.

When the chamber 64 is fitted in place in the exhaust pipe 208, exhaust gases pass through the openings 234 in the walls 228 and 232 to heat the interior wall 204 of the chamber. Heating of the interior wall 204, of course, serves to heat the water in the chamber so that it can be converted to steam. To enhance the heating of the interior wall 204, a pair of cross plates 236 are disposed therewithin, as shown in FIGS. 2 and 3, generally in planes parallel to the direction of flow of exhaust gases. As the exhaust gases flow past the plates 236, the plates are heated and this heat is conducted to the interior wall 204.

Steam produced by the heating apparatus 28 is supplied via conduits 70 and 80 to a pressure/temperature relief valve 82 coupled into the conduit 80. The relief valve 82 operates to release steam to a return line 84 (coupled to the supply tank 20), when the steam pressure exceeds some predetermined level such as four p.s.i. Upon release of steam and a dropping of the pressure in the conduit 80, the pressure/temperature relief valve 82 closes to prevent further release of steam. Provision of the relief valve 82 serves to maintain the pressure of the steam in the conduit 80 at a predetermined low level and thus serves to maintain the temperature of the steam at some predetermined low level such as 220° F. By maintaining the pressure and temperature of the steam at predetermined low levels, the steam supplied to the intake port of the carburetor 8 will interfere less with the fuel to air ratio in the carburetor since the temperature of the inrushing air will not be increased to cause the air to expand as greatly with low temperature steam. Also, it is desired that as the steam is introduced into the intake port 16 of the carburetor 8, it will be converted to a mist or fog for conveyance along with the fuel/air mixture to the combustion chambers of the internal combustion engine 4. Conversion of the steam to fog by the inrushing air is made easier if the temperature of the steam is as low as possible. Of course, it is desired that fog and not steam be introduced into the combustion chambers of the engine because the fog will better serve to absorb heat and thus help control flame advance and pre-ignition, and will also expand a greater multiple of its volume than would steam to thereby enhance power production in the combustion chambers, i.e., aid in driving the combustion chamber piston.

Figure 4:
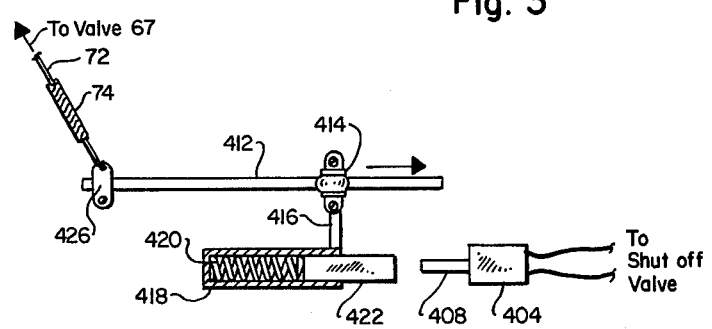
FIG. 4 shows a throttle speed switch for use in conjunction with the system of FIG. 1.

The steam produced by the heating apparatus 28 is carried from conduit 80 by conduit 88 to an on/off valve 86 disposed in the conduit. The valve 86 is normally closed so that steam is prevented from reaching the carburetor 8, and is caused to open upon receipt of a signal from a throttle advance switch shown in detail in FIG. 4. Referring to FIG. 4, there is shown the throttle advance switch 404 which is mounted on the internal combustion engine at a location adjacent to the engine's throttle control rod 412. The switch 404 includes a plunger 408 which, then depressed into the switch 404, causes the switch to operate and signal the valve 86. Mounted on the throttle control rod 412 by way of a clamp 414 is a contact element 416 in the form of a dependent finger. Mounted on the finger 416 is a casing 418 (shown in cross-section) containing a compressible spring 420. One end of a contacting plug 422 is disposed in the casing 418 and attached to the spring 420. As the throttle control rod 412 is moved to the right to increase the speed of the engine, the contacting plug 422 is moved into contact with the plunger 408 to force the plunger into the switch 404 to thereby operate the switch. The clamp 414 is mounted on the rod so that the switch 404 will be operated as a certain engine speed is reached. When the plunger 408 of the switch 404 becomes fully depressed and the throttle control rod 412 is moved further to the right, the contacting plug 422 is forced further into the casing 418 to compress the spring 420. Provision of the contacting plug 422, casing 418, and spring 420 allows moving the throttle control rod 412 further to the right even though the plunger 408 "bottoms out" in the switch. As already indicated, when the switch 404 is operated, it signals the valve 86 to cause the valve to open and allow steam to flow from the conduit 88 to a condensate separator 90.

Also shown in FIG. 4 is the flexible wire 72 (and sheath 74) shown coupled by way of a clamp 426 to the throttle control rod 412. As the throttle control rod 412 is moved to the right, the wire 72 is pulled (the sheath 74 being held stationary) to cause the valve 67 (FIG. 1) to further open.

The condensate separator 90 (FIG. 1) provides for removing water droplets from the steam prior to introduction of the steam into the intake port 16 of the carburetor 8. The condensate separator 90 includes a pair of condensate traps 92 and 94. These traps are generally bowl shaped to fit on the underneath side of corresponding conduits under openings formed in the conduits. Trap 92 is coupled to a drain conduit 98 which, in turn, is formed into a conventional P-trap configuration 100 and from there is connected back to the supply tank 20. Trap 94 is coupled by way of conduit 104 to the drain conduit 98. Water droplets being moved in the conduit 96 and conduit 108 toward the intake port 16 of the carburetor will run into the traps 92 and 94 and from there into the drain conduit 98. Such water vapor tends to collect during shut down of the internal combustion engine and it is desirable that when the engine is again started the water vapor be removed.

The P-trap configuration 100 is provided to prevent the loss of vapor pressure through the drain conduit 98. The water vapor fills the U-shaped portion of the P-trap 100 to prevent the loss of vapor pressure and yet allows water to ultimately flow to the supply tank 20 where it can be reused.

With the system described, low pressure/low temperature steam is supplied to the intake of the carburetor 8 of an internal combustion engine where it is converted to fog for delivery to the combustion chambers of the engine. This serves to decrease the levels of pollutants in the exhaust gases of the engine, to control flame advance, and to enhance power production of the engine. The two-chamber heating apparatus 28 allows for both a continual production of steam, but also production of steam only as such steam is needed or demanded by the engine. Water is supplied to the heating apparatus 28 via a water flow control container 24 which monitors the level of water in the container so that the volume of water delivered to the heating apparatus is maintained at a fairly constant level. In fact, if the water level in the container 24 reaches a certain level, water flow into the container is cut off entirely by valve 26.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. For use with an internal combustion engine having a carburetor with an air intake, low pressure/low temperature vapor generating apparatus comprising
    a source of liquid,
    means for heating the liquid from the source to convert it to vapor,
    means for delivering the vapor from the heating means to the air intake of the carburetor,
    pressure relief means coupled into said delivering means for operating to vent the delivering means when the pressure therein exceeds a predetermined level, to thereby maintain the pressure in the delivering means at or below the predetermined level, and
    means for conveying to the liquid source, vapor which has been vented by the pressure release means.

2. Apparatus as in claim 1 wherein said delivering means includes condensate separator means located between the pressure relief means and the carburetor for removing condensed liquid droplets from the delivering means, said condensate separator means comprising
    a conduit for conveying vapor, said conduit having an opening in the bottom thereof,
    trap means disposed under the opening in the conduit for receiving liquid droplets flowing in the conduit, and
    a drain pipe for conveying liquid from the trap means.

3. Apparatus as in claim 2 wherein said drain pipe extends downwardly from the trap means, then upwardly a certain distance, and then downwardly again to form a P-trap configuration.

4. Apparatus as in claim 2 wherein that portion of the conduit between the trap means and the carburetor extends upwardly and then generally horizontally toward the carburetor, and wherein the horizontally extending portion of the conduit includes a second opening in the bottom thereof, said condensate separator means further including
    second trap means disposed under the second opening for receiving liquid droplets flowing in the horizontal portion of the conduit,
    a drain pipe for conveying liquid from the second trap means, and
    means coupling said drain pipe to said source of liquid.

5. Apparatus as in claim 1 further including liquid flow control means intercoupling the source of liquid with the heating means for controlling the volume of liquid delivered to the heating means from the source of liquid, said liquid flow control means including
    a holding tank for receiving liquid from the source through an input orifice located in the top of the tank, and for delivering liquid to the heating means through an output orifice located at or near the bottom of the tank, and
    regulator means for reducing the volume of liquid flowing through the input orifice into the tank as the liquid level in the tank increases, and for allowing an increase in the volume of liquid flowing through the input orifice as the liquid level decreases, said regulator comprising
        a float element disposed to float on the surface of the liquid in the tank,
        a blocking element mounted on the float element to move upwardly and block the input orifice as the liquid level in the tank increases to thereby reduce the volume of liquid flowing through the input orifice,
    switch means mounted on the tank and including a finger element which projects into the tank, said switch means operating when the finger element is moved upwardly,
        a float element mounted on the finger element to float on the liquid in the tank when the liquid reaches a certain level, and to move the finger element upwardly as the liquid level increases, and
    valve means coupled between the source of liquid and the input orifice and responsive to the said switch means operating for closing to prevent the flow of liquid from the source of liquid to the input orifice, and for remaining open to allow the flow of liquid when the switch means is not operated.

6. Apparatus as in claim 5 wherein the internal combustion engine includes a source of heat, and wherein said heating means includes a first chamber into which liquid flows from the liquid flow control means, said chamber being positioned in proximity to or in contact with the source of heat so that liquid in the chamber is converted to vapor, said apparatus further including a pressure equalization conduit one end of which is coupled into the delivering means at a location between the pressure relief means and the carburetor, and the other end of which is coupled into the water flow control means, for maintaining the pressure in the chamber substantially equal to the pressure in the water flow control means.

7. For use with an internal combustion engine having a carburetor with an air intake, and a source of heat, low pressure/low temperature vapor generating apparatus comprising
    a source of liquid,
    means for heating the liquid form the source to convert it to vapor, means for delivering the vapor from the heating means to the air intake of the carburetor, liquid flow control means intercoupling the source of liquid with the heating means for controlling the volume of liquid delivered to the heating means from the source of liquid, said heating means including
- a first chamber into which liquid flows from the liquid flow control means, said chamber being positioned in proximity to or in contact with the source of heat so that liquid in the chamber is converted to vapor,
- a second chamber positioned in proximity to or in contact with the source of heat so that liquid received into the chamber is converted to vapor,
- means for conveying liquid from the liquid flow control means to the second chamber, and
- means for conveying vapor from the second chamber to the delivering means.

8. Apparatus as in claim 7 further including thermal detector means for detecting the temperature of some preselected part of the internal combustion engine, and for producing a signal when a certain temperature is reached,
and
valve means disposed in the water conveying means for normally blocking the flow of water to the second chamber, and responsive to the signal produced by the thermal detector means for opening to allow the flow of water.

9. Apparatus as in claim 8 further including a check valve means disposed in the water conveying means for allowing water to flow to the second chamber when the pressure in the second chamber is below a certain level, and for preventing water from flowing to the second chamber when the pressure in the second chamber is above the certain level.

10. Apparatus as in claim 7 wherein the source of heat is an exhaust pipe, and wherein the second chamber comprises a jacket fitted about the exhaust pipe to carry water into contact with the pipe and then away from the pipe.

11. Apparatus as in claim 10 wherein that portion of the exhaust pipe surrounded by the jacket includes a heat conductive plate disposed within the pipe in contact with the inside walls of the pipe, with the plane of the plate being generally parallel with flow of exhaust gases in the pipe.

12. Apparatus as in claim 1 further including volume control valve means disposed in said delivering means for allowing more steam to flow in the delivering means as the speed of the engine increases.

13. For use with an internal combustion engine having a carburetor with an air intake, and a throttle which, when moved in one direction, increases the speed of the engine, low pressure/low temperature vapor generating apparatus including
- a source of liquid,
- means for heating the liquid from the source to convert it to vapor,
- means for delivering the vapor from the heating means to the air intake of the carburetor,
- pressure relief means coupled into said delivering means for operating to vent the delivering means when the pressure therein exceeds a predetermined level, to thereby maintain the pressure in the delivering means at or below the predetermined level,
- switch means for operating when the throttle is moved in said one direction a certain distance, and
- valve means disposed in said delivering means, said valve means being normally closed to prevent the flow of vapor in the delivering means to the carburetor, and being responsive to the operation of said switch means for opening to allow the flow of vapor in the delivering means.

14. A method of introducing low pressure/low temperature vapor into the air stream intake of a carburetor of an internal combustion engine comprising
- providing a source of liquid,
- heating liquid received from the source to convert it to vapor,
- delivering the vapor to the air stream intake of the carburetor,
- maintaining the pressure of the delivered vapor at or below some predetermined level,
- controlling the volume of water heated at any particular time so that it does not exceed a certain amount, and
- substantially equalizing the pressure of the delivered vapor with the pressure at the controlling step.

15. A method as in claim 14 further including the steps of
- removing liquid droplets from the vapor as the vapor is delivered to the carburetor,
- trapping a portion of the removed liquid in a P-drain configuration to prevent escape of vapor through the drain through which liquid is removed, and
- carrying removed liquid back to the source of liquid.

16. A method as in claim 14 further including the step of preventing the delivery of steam to the carburetor until the speed of the internal combustion engine reaches a certain predetermined level.

17. A method as in claim 14 wherein said controlling step comprises
- receiving liquid from the source into a holding tank,
- reducing the flow of liquid into the tank as the liquid level in the tank increases, and
- stopping the flow of liquid into the tank when the liquid level in the tank exceeds a certain level.

18. A method as in claim 17 wherein said reducing step comprises stopping the flow of water into the tank when the water level in the tank exceeds a certain level.

19. A method as in claim 14 wherein said heating step comprises
- heating water in a first chamber as the water is received from the source of water,
- heating water received from the source of water in a second chamber, and
- preventing the flow of water to the second chamber until the temperature of a preselected part of the internal combustion engine exceeds a certain level.

20. A method as in claim 19 further including the step of preventing the flow of water to the second chamber when the pressure in the second chamber exceeds a certain level.

21. A method as in claim 14 wherein said heating step comprises heating the water from the heat developed in the exhaust gases of the internal combustion engine.

22. A method as in claim 14 further including the step of allowing more steam to be delivered to the carburetor as the speed of the internal combustion engine increases.

* * * * *